Patented Mar. 12, 1940

2,193,563

UNITED STATES PATENT OFFICE 2,193,563

RUTILE PIGMENT FROM BARIUM TITANATE

Robert M. McKinney, Wilmington, Del., assignor to E. I. du Pont de Nemours & Company, Wilmington, Del., a corporation of Delaware No Drawing. Application March 10, 1939, Serial No. 260,914

10 Claims. (Cl. 134—58)

This invention relates to the production of improved pigments. More particularly it relates to a process for the production of rutile containing pigments from titaniferous materials. Still more particularly it relates to a process for the production of titanium dioxide possessing the crystalline pattern of rutile from anatase titanium oxide.

It is known in the art that titanium chloride solutions can be hydrolyzed to give a rutile pigment upon boiling the solution after the addition of a specially prepared seed material. The production thus obtained will vary in properties to a large extent depending on the character of the solution and the impurities which it may possess. In the practice of this hydrolysis method it has been found extremely desirable to have a chemically pure titanium solution and this necessitates the use of a chlorination process and the purification by distillation of the anhydrous titanium chloride thereby produced. Anhydrous titanium chloride of high purity is possible in this way and the aqueous solutions prepared therefrom have given good results in the production of rutile pigments. The main disadvantage of the process is the cost of producing the titanium tetrachloride since corrosive materials must be handled at high temperatures. The problems encountered in the process have not been satisfactorily overcome in spite of the desirability of producing rutile titanium dioxide pigments, which pigments are known to possess superior hiding power and tinting strength.

The refractive index of rutile is 2.71, whereas the refractive index of anatase is 2.52, said anatase being the modification now found in commercial titanium dioxide pigments. The hiding power of a pigment is largely determined by the difference in refractive index between the pigment itself and the vehicle in which it is suspended or contained. Since linseed oil has a value of about 1.48 the differential between oil and rutile is considerably greater than that between oil and anatase. The hiding power of the two crystalline forms has been found to vary in accordance with this prediction and rutile has been found to have a hiding power of at least 20% or 25% higher than rutile.

The most common titanium material is ilmenite and this is believed to have the structure of $FeTiO_3$. None of the ilmenite deposits of the world have exactly this structure and in some instances there is considerable deviation from the given formula. It has been proposed that ilmenite be dissolved in hydrochloric acid and the resulting solution be hydrolyzed. This has been attempted but it has been found that the more commonly used ores are not sufficiently soluble in hydrochloric acid. The greater the deviation from the formula $FeTiO_3$ the less soluble the ilmenite becomes in hydrochloric acid and the less attractive is the proposed process commercially.

Solutions thus prepared have also the disadvantage that they contain metallic impurities found in the ore and these contaminate the resulting precipitated rutile. The amount of color contamination in the case of rutile precipitates has been found to be much more pronounced than when the same ore is used with sulfate solutions for producing anatase. One might conclude that the rutile precipitate is a stronger absorbent than anatase and this is an important observation in connection with the precipitation of materials of the fineness of titanium pigments.

This invention has as an object the production of rutile pigments from titaniferous materials. A further object is the production of rutile pigments from titanium oxide materials, said titanium oxide materials being devoid of the crystal pattern of rutile. A still further object is the production of rutile extended pigments. A still further object is the production of precipitated rutile from anatase titanium oxide. Additional objects will become apparent from an examination of the following description and claims.

These objects are attained according to the herein described invention which broadly comprises interacting a basic barium compound with a titanium material, thereby forming barium titanate, subsequently dissolving the barium titanate in a monobasic acid and hydrolyzing the resultant titanium solution, thereby producing a rutile pigment.

In a more restricted sense this invention comprises digesting hydrolytically precipitated titanium dioxide with a barium hydrate containing solution at a temperature between about 80° C. and about 100° C. to give a water insoluble barium titanate product, subsequently dissolving said water insoluble barium titanate product in a monobasic acid, thereby forming a titanium salt solution along with the corresponding barium compound, and thereafter hydrolizing the titanium solution after the addition of a seeding or nucleating agent to give a rutile precipitate.

The preferred embodiment of this invention comprises suspending an anatase product in a barium hydrate containing solution using stoichiometrical quantity of barium hydrate and heating the two together at the boiling temperature for a period of time between about 1 hour and about 3 hours. This reaction takes place readily and the barium hydrate is removed from the solution during the reaction and appears as barium titanate in the solid phase. Furthermore, practically all of the titanium dioxide can be converted to barium titanate by this reaction and it it unnecessary that a large excess of either of the reactants be present during the digestion process.

During the separation of the barium titanate from the reacting medium a dewatering operation such as filtration or filtration and washing plus evaporation is recommended. Evaporation of the contained water is desirable for purposes of economy so that dilution of the acid in the subsequent step is thereby avoided. The barium titanate thus produced is mixed with a monobasic acid. As a general rule, I have found that the optimum benefits are obtained when the concentration of the acid is between about 18% and about 50 %, although concentrations outside of this range are operable. When the titanate is suspended in the acid, the temperature is maintained at or near room temperatures for at least 1 hour to effect decomposition of the titanate and to dissolve the titanium content of this compound. In the event that the acid selected is hydrochloric acid, barium chloride and titanium chloride are formed and the latter appears in the solution while the barium chloride appears only to the extent of its solubility in the chloride medium. Barium salt crystals can be removed from the titanium solution prior to the hydrolysis of the latter and such a step is recommended unless a composite or extended pigment is desired. In the event that such a pigment is desired, sulfuric acid may be added to the solution to convert the barium compound into barium sulfate, but care should be exercised to avoid the presence of substantial amounts of sulfuric acid and sulfates in the resulting solution.

The titanium oxide material used in the preparation of barium titanate may be produced in various ways well-known in the art, but it is recommended that it be obtained by the hydrolytic precipitation from titanium sulfate solution. It is obvious that since the product is not to be calcined directly to a titanium pigment one does not need to take the precautions which are so necessary to regulate the particle size of the precipitate as for maximum strength and hiding power. However, the product should be precipitated by a process which avoids the occlusion of color imparting metal compounds such as the oxides of chromium and vanadium. The processes described in U. S. Reissue Patents 18,790 and 18,854 have been found to give very satisfactory results.

The precipitated titanium dioxide contains adsorbed sulfuric acid which cannot be removed by washing unless it has first been neutralized to form a soluble sulfate, such as ammonium sulfate or sodium sulfate upon the addition of an alkaline reacting hydroxide or carbonate. In the event that a titanium pigment containing no barium sulfate is desired, such a desulfation process is practiced, otherwise the sulfate content of the precipitated anatase will appear as barium sulfate in the finished rutile pigment. This desulfation is optional with the process and is not to be considered a vital step in the production of rutile pigments by this invention.

The anatase from the sulfate hydrolysis which has been indicated herein as a suitable starting material should be free of all iron and other heavy metal compounds prior to its use in the precipitation of rutile. This is conveniently done by filtration and washing procedures well-known in the art.

The acid which is employed in my process for the production of the titanium solution for hydrolysis must be a monobasic acid such as hydrochloric, nitric, perchloric, hydrobromic, and the like. The amount of acid used should be sufficient to form the normal barium salt and in addition, sufficient to form the normal titanium salt. However, it may vary substantially from this requirement but amounts less than 4 mols of the acid for each mol of the titanate are not recommended. The preferred range is between about 5 and about 8 mols of the acid for each mol of barium titanate.

Nitric acid is the preferred monobasic acid in my herein described process. This is preferred for two reasons, the first being that it has less corrosiveness than the other monobasic acids. The second reason is the relatively low solubility of barium nitrate compound in dilute nitric acid and titanium nitrate solutions. Due to this low solubility the barium compound can be removed from the titanium solution to a large extent and substantially all of it is removed when the nitric acid is recirculated back to the dissolving step after regeneration in the hydrolysis. This acid also has the advantage that it can be concentrated by simply boiling to a higher strength than other monobasic acids and this allows one to maintain higher concentrations in the hydrolysis than would otherwise prevail.

I have found it desirable that the conditions of the dissolving operation are such that the resulting solution will contain a $TiO_2$ concentration in excess of about 50 grams per liter and up to about 125 grams per liter or more. Likewise, I have found it desirable that the amount of monobasic acid used in combination with the titanium to be hydrolyzed is such that the amount will preferably be between about 3 and about 6 mols of acid per mol of $TiO_2$.

The amount of water in the barium titanate cake at the time of its addition to the acid and the acid concentration determine the concentration of the titanium solution which is to be hydrolyzed. Ordinarily, these concentrations should be so selected that the titanium solution analyzes not less than about 50 grams of $TiO_2$ per liter. In addition, the acid concentration in the solution to be hydrolyzed should ordinarily not be less than about 12% or about 15% strength.

The titanium solutions thus prepared are conveniently hydrolyzed by the process of U. S. Patent 2,062,133. In this process a portion of the titanium is precipitated and conditioned for use as a seeding or nucleating agent. It is precipitated under conditions of reduced acidity and after holding it at an elevated temperature of about 80° C. for about 15 to about 20 minutes it is then usable directly by addition to the solution to be hydrolyzed.

This invention may be more readily understood from an examination of the following examples which are given for illustrative purposes and are not intended to place any restrictions or limitations on the herein described invention.

*Example 1*

100 parts by weight of precipitated $TiO_2$ in the form of a wet filter cake, obtained by filter press washing of the hydrolysate product from a titanium sulfate solution, was repulped in water using enough of the latter to provide a concentration of 200 grams TiO$_2$ per liter. The slurry was made neutral by addition of Na$_2$CO$_3$, thereby neutralizing the absorbed H$_2$SO$_4$ contained in the starting material. The soluble sulfate formed upon the neutralization was next removed by washing and the resulting desulfated cake was slurried in a barium hydrate solution containing an equivalent amount of barium hydrate (214 parts of Ba(OH)$_2$ by weight). This suspension was boiled for two hours after which it was tested for soluble barium. Substantially all of the barium hydroxide had been removed from solution through combination with the titanium oxide. The resulting barium titanate was dewatered by means of a filter press and the product then suspended in concentrated hydrochloric acid containing 274 parts by weight of anhydrous HCl. The suspension was at first quite opaque but became more transparent as the titanium was dissolved and the barium content became barium chloride, a portion of which was in the crystalline condition due to its low solubility in HCl solutions. The titanium solution was separated from the barium chloride crystals and hydrolyzed by the method of U. S. Patent 2,062,133. It was found by X-ray to be precipitated rutile titanium dioxide and upon calcination gave a strength 20% greater than the best titanium pigment now found on the market. Furthermore, the color of the calcined pigment was better than the present titanium oxide of commerce.

Example II

Hydrated titanium oxide, which was washed free of sulfates after neutralization, was slurried in water to form a slurry having a TiO$_2$ concentration of approximately 15% by weight. Barium hydroxide (Ba(OH)$_2$.8H$_2$O) was added to this slurry in a molecular ratio of Ba(OH)$_2$:TiO$_2$ of 1:1 and the slurry was then heated to boiling where it was held for approximately one hour. Substantially complete reaction took place during the heating period and the reaction product was a barium titanate suspension in water which contained only a very small amount of unreacted barium hydrate.

This barium titanate was dewatered by filtration and suspended in nitric acid of 50% strength using 6 molar weights of the latter to each molar weight of the barium titanate. The mixture was allowed to react with agitation at room temperature for about two hours during which time the titanate was converted to a titanium nitrate (Ti(NO$_3$)$_4$) solution and barium nitrate, the larger part of which was present as insoluble crystals. The latter were separated from the solution and, after the addition of a conditioned seed suspension to the solution, hydrolysis was had by the application of heat in the usual manner. The seed was prepared from a portion of the titanium nitrate solution after dilution to about 30 gms. TiO$_2$ per liter by a novel method comprising the addition of an equi-molecular amount of barium titanate thereto and heating the mixture to about 80° C. where it was maintained for 15 minutes. The seed suspension thus prepared and conditioned was found to be highly effective in this process and the hydrolysis product was found to be rutile of high quality, which calcined to pigment of very high tinting strength, hiding power, and color.

Example III

Hydrated precipitated titanium oxide was washed free of sulfate after neutralization with sodium carbonate and was placed in an aqueous slurry form having a TiO$_2$ concentration of 175 grams per liter. To this slurry was added 2 mols of barium sulfide per mole of TiO$_2$, the barium compound being present as a purified barium sulfide solution having a density of 30° Bé. This slurry was then heated to boiling and held at this temperature for about ¾ of an hour, after which it was washed on a filter to remove the nonreacted barium hydrosulfide. The resulting barium titanate was then processed as in Example II and the resulting rutile pigment was found to have properties similar to that produced in said example.

Example IV

Barium titanate was produced from barium sulfide solution and neutralized sulfate free hydrated titanium oxide as in Example III. The barium titanate suspended in the barium hydrosulfide solution was acidified without the removal of the solution using a mixture of hydrochloric acid and dilute sulfuric acid. This treatment was made in the cold, using sulfuric acid equal to the barium content of the suspension being treated and 4 mols of hydrochloric acid per mol TiO$_2$. During interaction a titanium chloride solution was produced, the barium salts were converted to barium sulfate and hydrogen sulfide was evolved. The reaction product, comprising a suspension of barium sulfate in titanium chloride, was heated to the boil, after the addition of the small amount of seed material, and a composite titanium oxide raw pigment was produced. This precipitate comprising a coalesced titanium barium pigment was separated from the weak acid and subsequently calcined to produce a rutile pigment of good hiding power and analyzing slightly more than 14% TiO$_2$, the remainder being barium sulfate. The hydrochloric acid recovered in the hydrolysis was used in the preparation of subsequent batches of titanium chloride from the titanate.

Example V

Barium titanate was prepared as in Example III from a barium sulfide solution and hydrate titanium oxide and the barium hydrosulfide solution removed by filtration. The filtered barium titanate was allowed to react in the cold with the amount of sulfuric acid equivalent to the barium content of the titanate and an amount of hydrochloric acid substantially equivalent to the titanium content of the titanate. This resulted in a suspension of barium sulfate in titanium chloride having a ratio of 1 molar quantity of barium sulfate for each molar quantity of titanium chloride. The resulting suspension was hydrolyzed as in the preceding example and the pigment calcined and tested for quality. This pigment was a composite coalesced pigment containing about 25% TiO$_2$ and 75% barium sulfate. Its strength was found to be about 25% greater than the barium titanium pigment of commerce of equivalent composition. The color was also superior to the titanium barium pigment now obtainable in the market.

It is to be understood that the herein described specific embodiments of my invention may be subjected to variation and modification without departing from the scope thereof. Although the optimum benefits from this invention are obtained by digesting hydrolytically precipitated titanium dioxide with a barium hydrate containing solution at a temperature between about 80° C. and about 100° C., temperatures outside of this range are operable. Thus, a temperature of 70° C. or lower may be employed but since the reaction proceeds more slowly under said condition it is not so desirable. Also, temperatures higher than 100° C. may be employed with the employment of autoclaves.

As is evident from the examples given above, my preferred raw material is an anatase precipitate such as that produced by the hydrolysis of titanium sulfate solutions. Such a product contains a small amount of adsorbed sulfuric acid which must be removed if a non-extended rutile pigment is to be produced. In the event that barium sulfate is to appear in the final product, this is unnecessary and when a sulfate containing titanium oxide is treated with barium hydrate the sulfuric acid is immediately converted to barium sulfate which carries through to the finished pigment.

The reaction between barium hydroxide and $TiO_2$ takes place with relatively great ease, especially the precipitated forms of titanium oxide. In case the titanium material has been exposed to high temperatures before the formation of the barium titanate, a longer time of contact will be necessary. The barium titanate thus produced, i. e. by wet reaction between barium hydroxide and titanium oxide, is readily soluble in cold dilute acids such as hydrochloric, nitric, perchloric, hydrobromic, etc. at room temperatures. Substantially higher temperatures are to be avoided due to the fact that hydrolysis will be encountered during the dissolution process. This temperature is preferably kept within the range of 10° to 30° C. although minor deviations can be tolerated.

As shown in the examples, barium hydrate can be obtained and used as such or a solution of barium sulfide such as that currently produced in the industry is suitable as a source of barium hydrate. If the latter is selected, only about one-half of the barium content has been found to react with the titanium oxide to form barium titanate and a solution of barium hydrosulfide remains. This can be separated from the titanate by filtration or other means well-known in the art or it can be reacted with an equivalent amount of sulfuric acid to form blanc fixe which is suitable as an extender for $TiO_2$. The process is further flexible to the extent that this blanc fixe can be removed from the barium titanate before it is converted to titanium solution or can be left in its presence to be a part of the coalesced extended pigment to be produced later. To summarize, the process is useful in either the preparation of a pure non-extended rutile pigment or it may be so operated that the final pigment will contain as much as 86% barium sulfate. The conditions to be selected are naturally dependent upon the analysis of the product to be desired and can be chosen at will.

According to this invention, one can start with anatase precipitate of the sulfate process and readily convert it to a solution from which rutile can be readily precipitated in a finely divided and pigment useful condition. Further, processing of the rutile precipitate develops a hiding power and tinting strength value which is unexcelled by other known processes. Further, the process allows one to obtain an extended rutile pigment using relatively cheap chemicals and at a cost which would compare with the currently marketed extended barium titanium pigments. If it is so desired, the barium used in this process can be converted to commercially valuable barium salts which have a greater value than the barium compound from which they originated.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for producing a rutile pigment which comprises digesting anatase titanium dioxide with a caustic barium solution, solubilizing the resulting barium titanate with a monobasic acid thereby forming the corresponding barium and titanium salts, and thereafter hydrolyzing the solution to precipitate the titanium oxide contained therein.

2. A process for producing a rutile pigment which comprises digesting anatase titanium dioxide with a basic barium compound, solubilizing the resulting barium titanate with a monobasic acid thereby forming the corresponding barium and titanium salts, and thereafter hydrolyzing the titanium salt solution to precipitate the titanium oxide therefrom.

3. A process for producing a rutile pigment which comprises digesting anatase titanium dioxide with barium hydrate, solubilizing the resulting barium titanate with a monobasic acid thereby forming the corresponding barium and titanium salts, and thereafter hydrolyzing the titanium salt solution to precipitate the titanium oxide therefrom.

4. A process for producing a rutile pigment which comprises digesting anatase titanium dioxide with a substantially equivalent amount of a basic barium compound, solubilizing the resulting barium titanate with a monobasic acid, the amount of acid employed being between about 5 mols and about 8 mols of acid per mol of titanium oxide, thereby forming the corresponding barium and titanium salts, and thereafter hydrolyzing the titanium salt solution to precipitate the titanium oxide therefrom.

5. A process for producing a rutile pigment which comprises digesting anatase titanium dioxide with barium hydrate, solubilizing the resulting barium titanate with nitric acid thereby forming the corresponding barium and titanium salts, and thereafter hydrolyzing the titanium salt solution to precipitate the titanium oxide therefrom.

6. A process for producing a rutile pigment which comprises digesting anatase titanium dioxide with a substantially equivalent amount of barium hydrate, solubilizing the resulting barium titanate with a monobasic acid, the amount of acid employed being between about 5 mols and about 8 mols of acid per mol of titanium oxide, thereby forming the corresponding barium and titanium salts, and thereafter hydrolyzing the titanium salt solution to precipitate the titanium oxide therefrom.

7. A process for producing a rutile pigment which comprises digesting anatase titanium dioxide with a substantially equivalent amount of barium hydrate, solubilizing the resulting barium titanate with a monobasic acid, the amount of acid employed being between about 5 mols and about 8 mols of acid per mol of titanium oxide, thereby forming the corresponding barium and titanium salts, and thereafter hydrolyzing the titanium salt solution to precipitate the titanium oxide therefrom.

8. A process for producing a rutile pigment which comprises heating a mixture comprising anatase titanium dioxide and a substantially equivalent amount of barium hydrate for a period of time between about 1 and about 3 hours at the boiling point of the solution, solubilizing the resulting barium titanate with nitric acid, the amount of acid employed being between about 5 mols and about 8 mols of acid per mol of titanium dioxide, thereby forming the corresponding barium and titanium salts, and thereafter hydrolyzing the solution to precipitate the titanium oxide contained therein.

9. A process for producing a composite rutile pigment which comprises digesting anatase titanium dioxide with a caustic barium solution, solubilizing the resulting barium titanate with a monobasic acid, subsequently adding thereto sulfuric acid, and thereafter hydrolyzing the solution to precipitate the composite titanium oxide barium sulfate therefrom.

10. A process for producing a composite rutile pigment which comprises digesting anatase titanium dioxide with barium hydrate, solubilizing the resulting barium titanate with a monobasic acid, subsequently adding sulfuric acid, and thereafter hydrolyzing the solution to precipitate the composite titanium oxide barium sulfate therefrom.

ROBERT M. McKINNEY.